United States Patent
Glacet et al.

(10) Patent No.: US 11,192,315 B2
(45) Date of Patent: Dec. 7, 2021

(54) SYSTEM FOR COATING AN OPTICAL ARTICLE WITH A PREDETERMINED COATING COMPOSITION, COATING DEVICE FOR SUCH A SYSTEM AND METHOD FOR USING THE SYSTEM

(71) Applicant: ESSILOR INTERNATIONAL, Charenton-le-Pont (FR)

(72) Inventors: Arnaud Glacet, Dallas, TX (US); Gérald Fournand, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 236 days.

(21) Appl. No.: 15/748,583

(22) PCT Filed: Jul. 29, 2016

(86) PCT No.: PCT/EP2016/068252
§ 371 (c)(1),
(2) Date: Jan. 29, 2018

(87) PCT Pub. No.: WO2017/017279
PCT Pub. Date: Feb. 2, 2017

(65) Prior Publication Data
US 2018/0215114 A1    Aug. 2, 2018

(30) Foreign Application Priority Data
Jul. 30, 2015   (EP) .................................... 15306240

(51) Int. Cl.
*B29D 11/00*   (2006.01)
*G02B 1/111*   (2015.01)
*G02C 7/04*   (2006.01)

(52) U.S. Cl.
CPC .. *B29D 11/00903* (2013.01); *B29D 11/00865* (2013.01); *G02B 1/111* (2013.01); *G02C 7/04* (2013.01)

(58) Field of Classification Search
CPC ........ B29D 11/00903; B29D 11/00865; G02B 1/111; G02C 7/04
(Continued)

(56) References Cited

U.S. PATENT DOCUMENTS 2,440,915 A    5/1948  Roehr
4,410,563 A   10/1983  Richter et al.
(Continued)

FOREIGN PATENT DOCUMENTS

EP    0203730    12/1986
EP    0749021    12/1996
(Continued)

OTHER PUBLICATIONS

European Search Report issued in European Patent Application No. 15306240, dated Jan. 15, 2016.
(Continued)

*Primary Examiner* — Michael B Cleveland
*Assistant Examiner* — Michael G Miller
(74) *Attorney, Agent, or Firm* — Norton Rose Fulbright US LLP

(57) ABSTRACT

The invention provides a system for coating an optical article with a coating composition (50), comprising a chamber configured to receive said article, a coating device configured to carry out a coating treatment of said composition for depositing it on said article in said chamber, by vaporizing said composition and by exposing at least a face of said article to the vaporized composition, and a control unit configured to control said coating device for coating said article by vaporizing said composition; said coating
(Continued)

device being formed as a single cartridge unit comprising a casing (41) configured to contain said composition, a vaporizing conduit (49) opening both into said casing and outside of said coating device, and a propelling member (52) configured to pressurize said composition; said coating device being configured to put in fluidic communication said propelling member in an operative state with said casing in order to carry out said coating treatment for coating an article.

13 Claims, 6 Drawing Sheets

(58) Field of Classification Search
USPC .................................................. 427/162–169
See application file for complete search history.

(56) References Cited

U.S. PATENT DOCUMENTS

| | | |
|---|---|---|
| 6,183,872 B1 | 2/2001 | Tanaka et al. |
| 6,251,523 B1 | 6/2001 | Takahashi et al. |
| 6,277,485 B1 | 8/2001 | Invie et al. |
| 6,379,776 B1 | 4/2002 | Tada et al. |
| 2009/0020071 A1* | 1/2009 | Banoun .................. B05D 5/067 118/308 |
| 2014/0161991 A1* | 6/2014 | Strobel .................. C23C 14/022 427/569 |
| 2014/0283749 A1* | 9/2014 | Chapet .................. C23C 14/243 118/726 |

FOREIGN PATENT DOCUMENTS

| | | | |
|---|---|---|---|
| EP | 0844265 | 5/1998 | |
| EP | 0933377 | 8/1999 | |
| EP | 1275624 | 1/2003 | |
| EP | 1324078 | 7/2003 | |
| EP | 2548991 | 1/2013 | |
| FR | 1583300 | 10/1969 | |
| WO | WO 2011/080472 | 7/2011 | |
| WO | WO 2014/114974 | 7/2014 | |
| WO | WO-2014114974 A1 * | 7/2014 | ............... B05D 1/60 |

OTHER PUBLICATIONS

International Search Report and Written Opinion Issued in International Patent Application No. PCT/EP2016/068252, dated Oct. 7, 2016.

Owens et al., "Estimation of the surface free energy of polymers," *J. Appl. Poly. Sci.*, 13:1741-1747,(1969).

* cited by examiner

SYSTEM FOR COATING AN OPTICAL ARTICLE WITH A PREDETERMINED COATING COMPOSITION, COATING DEVICE FOR SUCH A SYSTEM AND METHOD FOR USING THE SYSTEM

CROSS-REFERENCE TO RELATED APPLICATIONS

This application is a national phase application under 35 U.S.C. § 371 of International Application No. PCT/EP2016/068252 filed 29 Jul. 2016, which claims priority to European Patent Application No. 15306240.1 filed 30 Jul. 2015. The entire contents of each the above-referenced disclosures is specifically incorporated by reference herein without disclaimer.

FIELD OF THE INVENTION

The invention relates to systems for coating an optical article such as an ophtalmic lens, and in particular spectacle lenses preferably mounted on a spectable frame, with a predetermined coating composition such as for instance an anti-soiling coating composition or an anti-fogging coating composition or an adhesion coating composition.

The invention further relates to a coating device for such a system and to a method for using the system.

BACKGROUND ART

It is well known that lenses, and in particular spectacle lenses, comprise an ophthalmic substrate having geometrical features adapted to the wearer.

The ophthalmic substrate requires the adding of coatings, for instance an anti-abrasive coating to increase the abrasion resistance of the lens, an anti-reflective coating to decrease the reflection of light and an anti-soiling coating or an anti-fogging coating applied over the anti-reflective coating. The anti-soiling coating provides an outer coating that can be more resistant to contamination for instance by organic impurities and more easily cleaned than the anti-reflective coating whereas the anti-fogging coating provides an outer coating that can prevent any fog formation in very damp environments. The anti-soiling topcoat and the anti-fogging topcoat furthermore each protect the anti-reflective coating.

The wearer of the lens can wish to replace such an anti-soiling topcoat or an anti-fogging topcoat because the effects of said respective topcoat can decrease over time.

The European patent 2 548 991 describes a machine for recoating an optical article first by removing the initial outermost anti-soiling coating and next by depositing a new anti-soiling coating on the optical article.

The machine comprises a vacuum chamber having an interior space configured to receive the optical article, a vacuum pump connected to the vacuum chamber, a plasma generator configured to carry out a vacuum plasma treatment of the optical article in the vacuum chamber, an evaporation device configured to carry out a vacuum evaporation treatment of the anti-soiling coating composition also in the vacuum chamber, and a control unit configured to control the vacuum pump, the plasma generator for removing the initial outermost anti-soiling coating of the optical article and the evaporation device for recoating the optical article with the anti-soiling coating composition.

The evaporation device comprises a heating module which is configured to heat the anti-soiling coating composition, and which has a first support configured to be placed in the vacuum chamber.

The anti-soiling coating composition is received in a crucible which is located on the first support of the heating module.

The machine further comprises a second support configured to be placed in the vacuum chamber and on which the optical article is mounted.

The two distinct treatments are implemented in the same vacuum chamber of the machine.

The International patent application WO 2014/114974 describes a machine for coating an optical article first by activating a surface of the optical article and next by depositing a new anti-soiling coating on the optical article; or for recoating the optical article first by removing the initial outermost anti-soiling coating and next by depositing the new anti-soiling coating on the optical article.

The machine comprises a vacuum chamber having an interior space configured to receive an optical article, a vacuum pump connected to the vacuum chamber, a plasma generator configured to carry out a vacuum plasma treatment of the optical article in the vacuum chamber, a nebulizer configured to carry out a vacuum nebulization treatment of the predetermined coating composition in the vacuum chamber, and a control unit configured to control the vacuum pump, the plasma generator for removing the initial outermost coating of the optical article and/or for activating the surface of the optical article, and the nebulizer for nebulizing the predetermined coating composition which is liquid into a mist of aerosol droplets and for directing the droplets towards a surface of the optical article, for depositing the droplets on the surface in order to coat or recoat the optical article.

The nebulizer comprises a nozzle system and the machine further comprises a container which contains a determined volume of the predetermined coating composition, and a conduit configured to connect the container to the vacuum chamber in order to allow a fluidic communication between the container and the nebulizer.

The nozzle system comprises nozzle heads disposed in the vacuum chamber and the machine further comprises an inlet port and an outlet port in communication with the inlet port, both formed in the vacuum chamber, the conduit being in fluidic communication with the inlet port and the nozzle head being in fluidic communication with the outlet port.

The machine comprises a spraying valve interposed between the container and the inlet port.

The machine further comprises a support on which the optical article is configured to be received and located in the vacuum chamber such that the optical article is at a predetermined distance from the nozzle heads.

The container comprises a rigid casing delimiting an internal space which contains a determined volume of the predetermined liquid coating composition, and a propeller, for instance a gas such as air at atmospheric pressure, for propelling the volume of the liquid coating composition from the internal space to the conduit, until the nozzle heads and passing through the spraying valve, the inlet port and the outlet port.

The two distinct treatments are also advantageously implemented in the same vacuum chamber of the machine.

Further, the vacuum nebulization treatment of the machine allows the deposition of compounds that could or could not be evaporated, so that a larger range of liquid coating composition can be used.

SUMMARY OF THE INVENTION

The invention is directed to a similar kind of systems for coating an optical article with a predetermined coating composition, which system is improved while remaining simple to implement, compact and economic.

The invention accordingly provides a system for coating an optical article with a predetermined coating composition, comprising a chamber having an interior space configured to receive said optical article, a coating device configured to carry out a coating treatment of said predetermined coating composition for depositing it on said optical article in said chamber, by vaporizing said predetermined coating composition and by exposing at least a face of said optical article to the vaporized coating composition, and a control unit configured to control said coating device for coating said optical article by vaporizing said predetermined coating composition; said coating device being formed as a single cartridge unit, said coating device comprising a casing configured to contain said predetermined coating composition, a vaporizing conduit opening both into said casing and outside of said coating device, and a propelling member configured to pressurize said predetermined coating composition; said coating device being configured to put in fluidic communication said propelling member in an operative state with said casing in order to carry out said coating treatment.

The coating device of the system according to the invention is here a single cartridge unit for the optical coating composition to vaporize on the optical article.

The coating device formed as a cartridge is preferably configured to be located (entirely or not) inside the interior space of the chamber, when the optical article is loaded inside said chamber. That reduces the number of connections in the system and in particular between the chamber and other elements.

This cartridge can be easily inserted in any treatment process carried out by the system and is at least partially autonomous in the system. That means the propeller member may be preconfigured according to the predetermined coating composition to be vaporize, and inversely.

This is here particularly convenient because both the predetermined coating composition and the propeller device are housed in the same single cartridge unit, and thus are not independently provided. The settings of the system may also be simpler to implement.

This cartridge may also be previously prepared for a determined treatment. Thus, the cartridge may be prepared and next easily transportable and storable.

The cartridge may be prepared according to some structural parameters of the chamber which is configured to receive the cartridge, for instance by taken in consideration the distance between a support for the cartridge and a support for the optical article.

In particular, the vaporizing conduit and/or the casing and/or the propelling member may be configured according to parameters of the chamber and/or of the optical article to coat and/or of the coating composition to vaporize.

On the contrary, the cartridge may be prepared independently from the parameters relating for instance to the chamber and more generally relating to the system.

It may be convenient to provide a set of prepared cartridges which are of the standard type, the prepared cartridges being distinct from each other by the propelling member contained and/or by the coating composition contained.

It may be convenient to provide a set of semi-prepared cartridges which are of the semi-standard type, the semi-prepared cartridges being modular and having prepared modules formed for instance by a prepared casing containing a coating composition and by a prepared propelling member.

Thus, a user of the system as described above may select one cartridge amongst a plurality of prepared cartridges and use it, or may select one cartridge amongst a plurality of semi-prepared cartridges, next assemble the prepared modules and next use the assembled cartridge.

The cartridge according to the invention is further easy to handle and safe.

The cartridge may be disposable or may be recharged in order to be reutilized.

The cartridge and more generally the system according to the invention is compact, and the latter can be placed at an optician's premises, the optician being easily able to use said system.

According to features preferred as being very simple, convenient and economical for embodying the system according to the invention, said predetermined coating composition is a liquid composition, the coating device is a spraying device configured to carry out a spraying treatment of said predetermined liquid coating composition for depositing it on said optical article in said chamber, by nebulizing said liquid predetermined coating composition into a mist of aerosol droplets and by directing said droplets towards at least a face of said optical article; the control unit being configured to control said spraying device for coating said optical article with said predetermined liquid coating composition.

It will be noted that the term "nebulisation" here corresponds to a conversion of a liquid to a fine spray or an atomization. Next, the expression "mist of aerosol droplets" here means that the spraying device is configured to transform (nebulize) the liquid coating composition into a plurality of a liquid droplets arranged in suspension under the shape of a mist.

According to other features preferred as being very simple, convenient and economical for embodying the system according to the invention:

said casing is a rigid casing;

said chamber is a vacuum chamber, said system further comprises a vacuum pump connected to said vacuum chamber, and said control unit is further configured to control said vacuum pump for causing the vacuum pump to suck gases from said vacuum chamber before said vacuum coating treatment to bring said vacuum chamber to a predetermined required pressure for said vacuum coating treatment;

said coating device further comprises a valve member which is interposed between and connected both to said propelling member and to said casing, said valve member having an opened state allowing said fluidic communication between said propelling member and said casing;

said propelling member comprises a closed tank configured to contain a pressurized gas having a pressure value which is higher than a pressure value in said casing;

said propelling member comprises an expansion chamber configured to contain a gas, and a heating module configured to heat said expansion chamber such that said gas has a pressure value which is higher than a pressure value in said casing;

said propelling member comprises a chamber configured to contain a liquid, and a heating module configured to heat said liquid for vaporising it and for obtaining a gas having a pressure value which is higher than a pressure value in said casing;

said propelling member comprises a chamber configured to contain an explosive element, and an explosive primer configured to explode said explosive element such that said chamber has an internal pressure value which is higher than a pressure value in said casing;

said predetermined coating composition is a liquid composition and said conduit comprises an outlet opening outside said coating device and a plunging tube having a first end connected to said outlet and a second end, opposite to said first end, which is immersed in said liquid composition contained in said casing;

said system further comprises an initial treatment device configured to carry out an initial predetermined treatment of the optical article in said chamber, before coating said optical article with said initial predetermined coating composition, said control unit being configured to control said initial treatment device for treating an initial base coating of said optical article or a surface of said optical article;

said initial treatment device is a plasma generator configured to carry out a plasma treatment of said optical article in said chamber, said control unit is configured to control said plasma generator for removing an initial outermost coating of said optical article or for activating at least an external surface of said optical article; and/or said predetermined coating composition forms a topcoat on said optical article after said coating treatment, which topcoat is configured to bring a predetermined function to said optical article, selected amongst a list comprising an anti-soiling and an anti-fogging;

said predetermined coating composition forms an universal ahesion coating on said optical article after said coating treatment, which universal ahesion coating is configured to receive a predetermined topcoat.

The invention also provides a coating device configured to carry out a coating treatment of a predetermined coating composition for coating an optical article in a chamber of a system as described above, said coating device being formed as a single cartridge unit comprising a casing configured to contain said predetermined coating composition, a vaporizing conduit opening both into said casing and outside of said coating device, and a propelling member configured to pressurize said predetermined coating composition; said coating device being configured to put in fluidic communication said propelling member in an operative state with said casing in order to carry out said coating treatment; by virtue of which said predetermined coating composition may be vaporized and directed towards at least a face of said optical article.

The coating device according to the invention is a single cartridge unit for vaporizing the optical coating composition on the optical article.

This cartridge can be easily inserted in any treatment process and is at least partially autonomous. That means the propeller device may be preconfigured according to the predetermined coating composition to be vaporized, and inversely.

This cartridge may also be previously prepared for a determined treatment. Thus, the cartridge may be prepared and next easily transportable and storable.

The cartridge may be prepared according to some structural parameters of the chamber which is configured to receive the cartridge, for instance by taken in consideration the distance between a support for the cartridge and a support for the optical article.

In particular, the vaporizing conduit and/or the casing and/or the propelling member may be configured according to parameters of the chamber and/or of the optical article to coat and/or of the coating composition to spray.

On the contrary, the cartridge may be prepared independently from the parameters relating for instance to the chamber and more generally relating to the system.

It may be convenient to provide a set of prepared cartridges which are of the standard type, the prepared cartridges being distinct from each other by the propelling member contained and/or by the coating composition contained.

It may be convenient to provide a set of semi-prepared cartridges which are of the semi-standard type, the semi-prepared cartridges being modular and having prepared modules formed for instance by a prepared casing containing a coating composition and by a prepared propelling member.

Thus, a user of the system as described above may select one cartridge amongst a plurality of prepared cartridges and use it, or may select one cartridge amongst a plurality of semi-prepared cartridges, next assemble the prepared modules and next use the assembled cartridge.

The cartridge according to the invention is further easy to handle and safe.

The invention also provides a method for using a system as described above, comprising the steps of:

selecting an optical article and loading said optical article into an internal space of a chamber of said system;

providing a coating device of said system, containing a determined volume of a predetermined coating composition in a casing of said coating device, and loading said coating device into the internal space of said chamber;

carrying out said coating treatment by activating a propelling member of said coating device and putting in fluidic communication said propelling member in an operative state with said casing; by virtue of which said determined volume of a predetermined coating composition is pressurized, vaporized and directed towards at least a face of said optical article;

unloading said optical article and said coating device from said chamber.

According to features preferred as being very simple, convenient and economical for embodying the method according to the invention:

said step of providing said coating device comprises a step of selecting a coating device amongst a plurality of prepared coating devices or semi-prepared coating devices, according to parameters of said optical article to coat and in particular, according to a coating to apply and/or to a material comprised in an external surface of said optical article, and/or to a material comprised in a previously coated layer on said optical article;

said plurality of prepared coating devices or semi-prepared coating devices have distinct parameters, amongst a coating composition, and/or a volume of a coating composition contained in said casing, and/or said propelling member, and/or a pressurized parameter of said propelling member; and/or said step of providing said coating device further comprises, when the coating device selected is a semi-prepared coating device having a first module formed by a semi-prepared casing and/or a second module formed by a semi-prepared propelling member, a step of assembling said first module and said second module to form said coating device as a single cartridge unit.

BRIEF DESCRIPTION OF THE DRAWINGS

The description of the invention now continues with a detailed description of preferred embodiments given hereinafter by way of non-limiting example and with reference to the appended drawings. In these drawings.

DETAILED DESCRIPTION OF PREFERRED EMBODIMENTS

Figure 1:
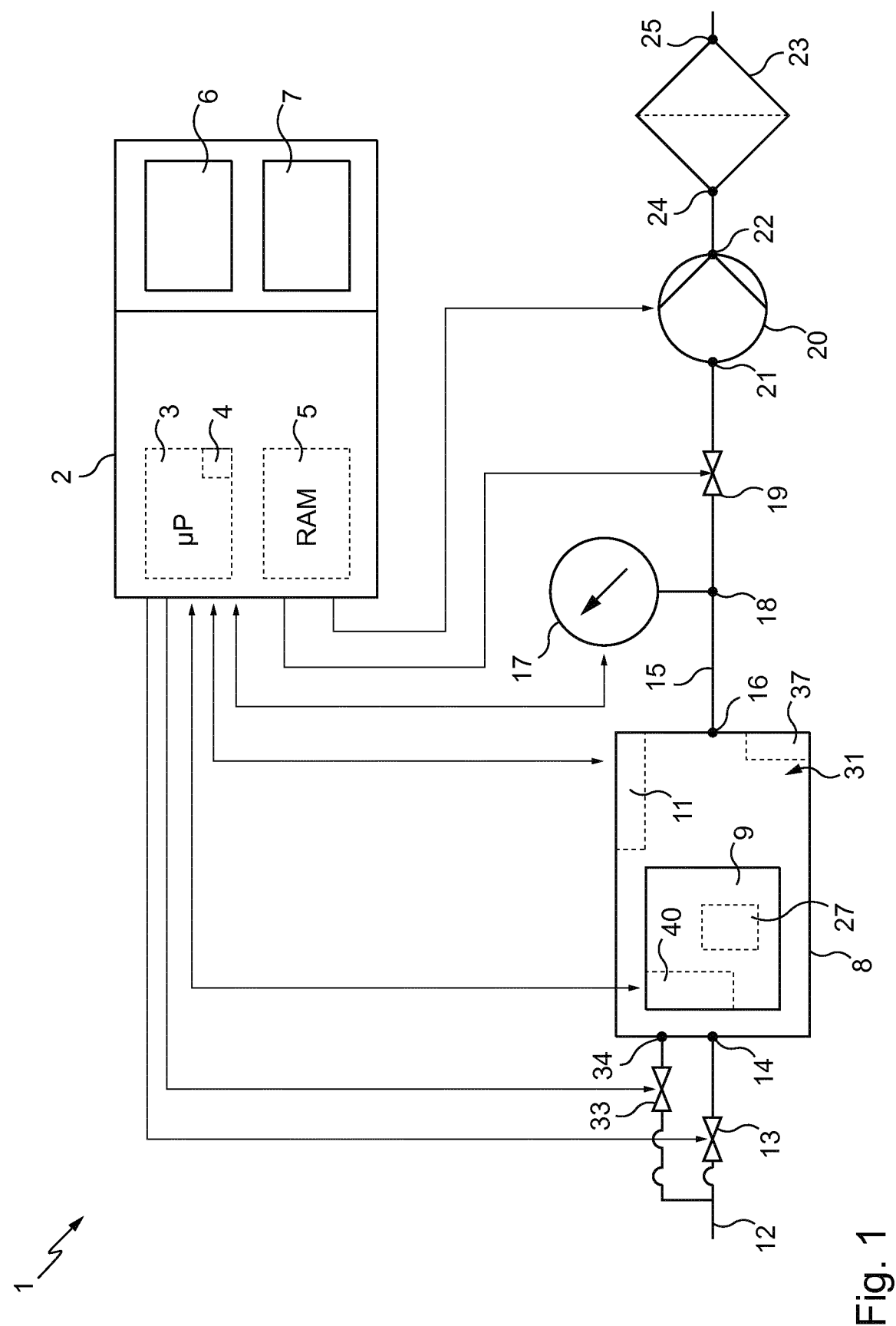
FIG. 1 is a schematic view of a system for coating according to the invention.

FIG. 1 shows a coating or recoating treatment system 1 for coating or recoating an optical article 28 formed here by spectacle lenses mounted on a spectacle frame.

The article 28 has a first surface 35 and a second surface 36 which is opposite to the first surface 35. The first surface 35 is for instance a concave surface of each lens of the spectacle lenses whereas the second surface 36 is for instance a convex surface of each said lens.

The system 1 here comprises:
a chamber 8;
optionally a plasma generator 11 connected to the chamber 8;
a coating device 40 connected to the chamber 8;
a support 27 located in the chamber 8;
optionally a polymerization device 37 connected to the chamber 8;
optionally an inlet circuit 12 connected to the chamber 8;
optionally a vacuum pump 20 connected to the chamber 8 by the intermediary of an outlet circuit 15; and
a control unit 2 configured to control the plasma generator 11, the coating device 40 and the polymerization device 37.

The chamber 8 is here a vacuum chamber and the coating device 40 is here a spraying device.

The vacuum chamber 8 comprises an interior space 31 configured to receive the spectacle lenses 28 mounted on a spectacle frame.

The spectacle lenses 28 are mounted on the support 27.

In a variant, only one lens is mounted in the interior space, or two lenses, without the spectacle frame.

The vacuum chamber 8 further comprises a door 9 which is removable (see description of FIGS. 2 and 3 below).

The plasma generator 11 is directly connected to the vacuum chamber 8.

The plasma generator 11 generally comprises a high-frequency generator.

The coating device 40 is here entirely placed in the vacuum chamber 8 and more precisely, the spraying device is mounted on the support 27.

In a variant, the coating device may be placed only partially in the chamber or outside the chamber but configured to be in fluidic communication with the interior space of the chamber.

The coating device 40 is configured to carry out a coating treatment of a predetermined coating composition for depositing it on the spectacle lenses 28 in the chamber 8, by vaporizing the predetermined coating composition and by exposing the first surface 35 and/or the second surface 36 of the spectacle lenses 28 to the vaporized coating composition.

The polymerisation device 37 is directly connected to the vacuum chamber 8.

The polymerisation device 37 generally comprises light sources, such as ultraviolet light or infrared light.

The vacuum chamber 8 further comprises a first inlet port 14 and a second inlet port 34 both connected to the inlet circuit 12.

The system further comprises a gas inlet valve 13 mounted on the inlet circuit 12 and an inlet valve 33 which is also mounted on the inlet circuit 12, parallel to the gas inlet valve 13.

The vacuum chamber 8 further comprises an outlet port 16 connected to the outlet circuit 15.

The vacuum pump 20 is connected to the outlet circuit 15 by the intermediary of an admission port 21 of the vacuum pump 20 and by the intermediary of an exit port 22 of the vacuum pump 20 so that the outlet circuit 15 passes through the vacuum pump 20.

The system 1 further comprises a pressure sensor 17 which is connected to the outlet circuit 15 by the intermediary of a branching point 18.

The system 1 further comprises a vacuum valve 19 which is mounted on the outlet circuit 15, between the branching point 18 and the admission port 21 of the vacuum pump 20.

The system 1 further comprises a filtering device 23 here formed by a gas filter.

The filtering device 23 is connected to the outlet circuit 15 by the intermediary of an entrance port 24 and an exhaust port 25 of said filtering device 23. The exhaust port 25 is linked to the atmosphere.

The filtering device 23 is here mounted at the end of the outlet circuit 15, after the vacuum pump 20.

The control unit 2 comprises a data processing system comprising a microprocessor 3 having a memory 4, in particular non-volatile, allowing a software application, in other words a computer program, to be loaded and stored therein, and which allows the method for coating and/or for recoating the spectacle lenses 28 to be carried out when it is executed in the microprocessor 3.

The non-volatile memory is for instance a read only memory.

The data processing system further comprises a memory 5, for instance volatile, allowing storage of data during the execution of the software and the implementation of the method.

The volatile memory 5 is for instance a random access memory or an electrically erasable programmable read only memory.

The control unit 2 further comprises a communication interface configured to communicate with the data processing system.

The communication interface is here formed by a graphic interface 6 and a keyboard 7.

The control unit 2 is configured to control and exchange data with the gas inlet valve 13, the coating device 40, the plasma generator 11, the pressure sensor 17, the vacuum valve 19 and the vacuum pump 20.

The control unit 2 is configured to control the coating device 40 for coating the spectacle lenses 28 by vaporizing the predetermined coating composition.

Figure 2:
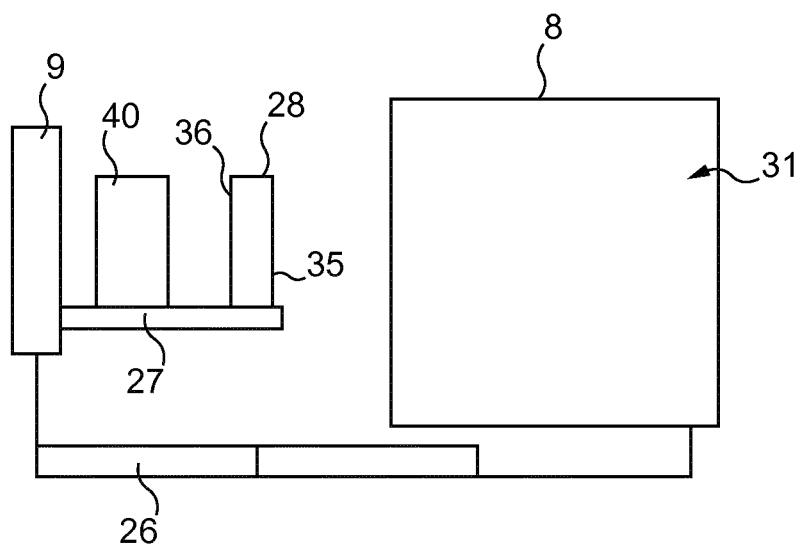
FIGS. 2 and 3 are partially schematic views of the system showing in particular a chamber and a coating device of the system, a door of the chamber being respectively open and closed.
Figure 3:
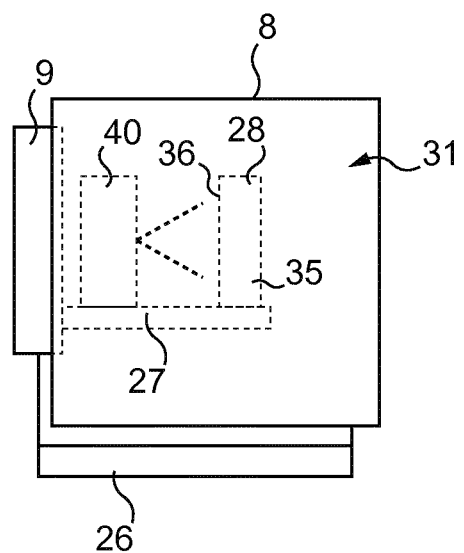

FIGS. 2 and 3 show in detail the vacuum chamber 8 and its removable door 9 respectively in an open state and in a closed state.

The vacuum chamber 8 comprises a displacement member 26 configured to slide the door 9 between its open and closed states.

The support 27 is mounted on the interior face of the door 9.

In a variant, the support in located inside the interior space of the chamber but not on the door.

The support 27 is here configured to receive both the spectacle lenses 28 mounted on the spectacle frame and the coating device 40.

The open state of the door 9 enables loading both the spectacle lenses 28 together with the spectacle frame and the coating device 40 on the support 27.

The coating device 40 faces the second surface 36 of the optical article 28.

In this closed state of the door 9, the spectacle lenses 28 together with the spectacle frame and the coating device 40 are here located in the vacuum chamber 8.

Figure 4:
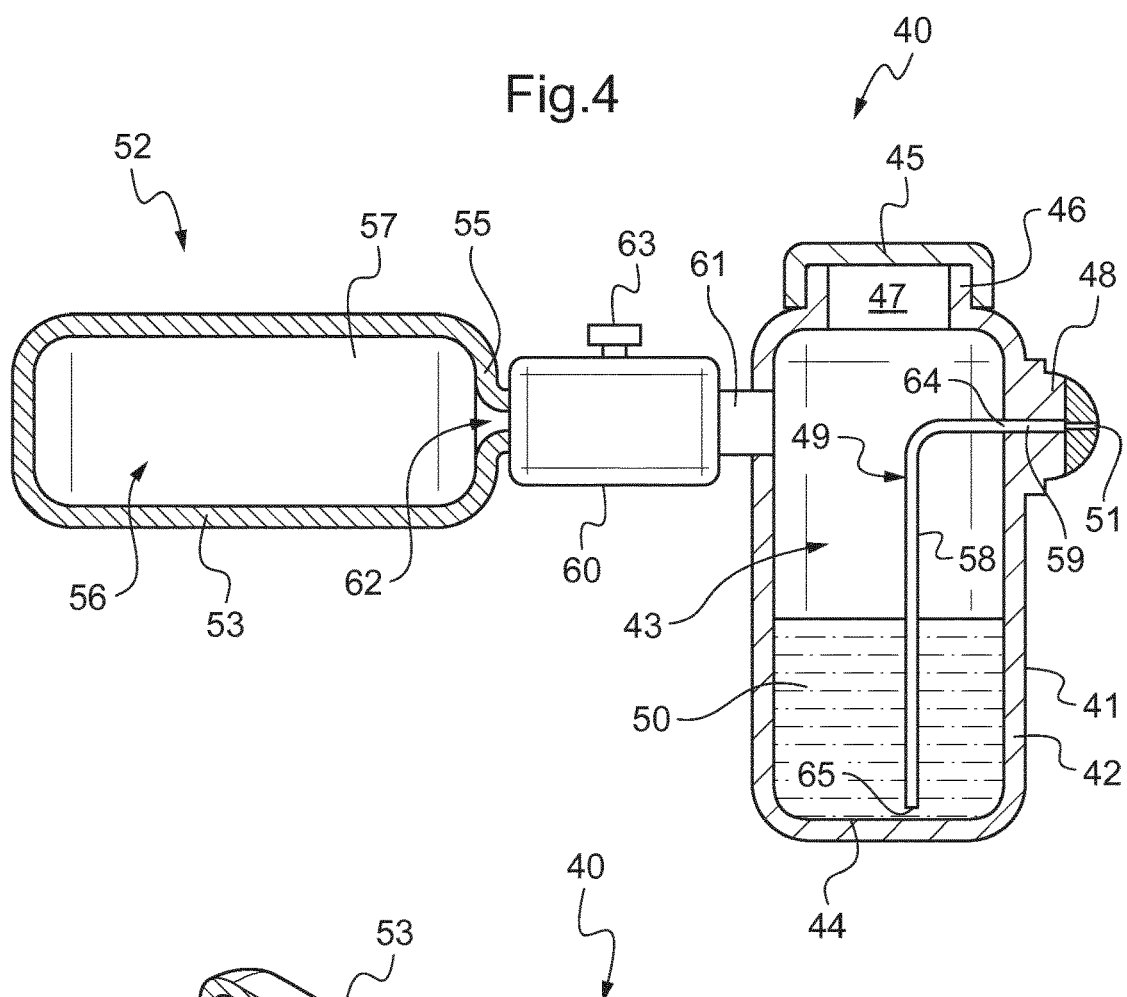
FIGS. 4 and 5 represent the coating device, shown partially in perspective and according to different view angles.
Figure 5:
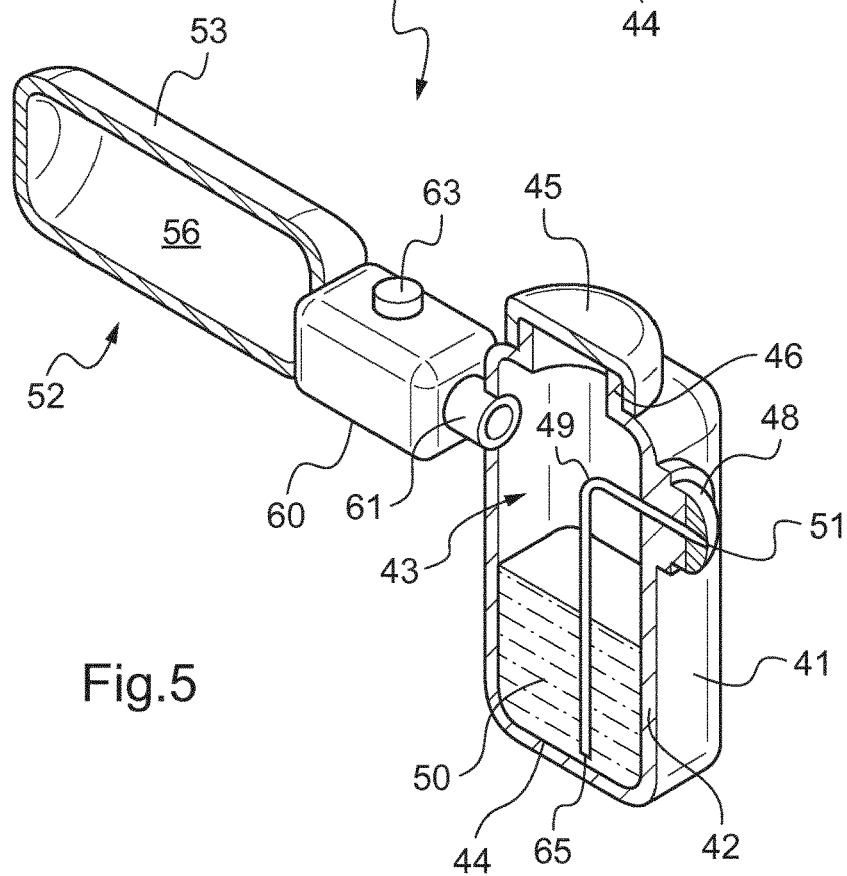

We will now describe in detail in reference to FIGS. 4 and 5 an embodiment of the coating device 40.

The coating device is here a spraying device 40 which is configured to carry out a spraying treatment of a predetermined liquid coating composition 50 for depositing it on the spectacle lenses 28 in the chamber 8, by nebulizing the liquid predetermined coating composition 50 into a mist of aerosol droplets and by directing the droplets towards the first surface 35 and/or the second surface 36 of the spectacle lenses 28.

Accordingly, the control unit 2 is therefore configured to control the spraying device 40 for coating the spectacle lenses 28 with the predetermined liquid coating composition.

The spraying device 40 is here formed as a single cartridge unit, which may be disposable. Such a single cartridge unit 40 may be previously prepared for a determined treatment, transportable and storable.

The cartridge 40 comprises a casing 41, which is here a rigid casing made for instance from plastic material or metallic material.

The casing 41 has a body defined by a cylindrical lateral wall 42, a bottom wall 44, a collar 46 which is opposite to the bottom wall 46 and a vaporizing nozzle 48 protruding from the cylindrical lateral wall 42, and located here in the vicinity of the collar 46.

The body of the casing 41 defines an interior space 43 configured to contain liquid predetermined coating composition 50, the latter being introduced in the interior space 43 by virtue of a hole 47 formed in the body and surrounded by the collar 46.

Preferably, the interior space 43 and the liquid coating composition 50 are not under pressure.

The casing 41 has here a shape of a bottle and further comprises a removable cap 45 configured to cooperated with the collar 46 for obtruding the hole 47.

The spraying device 40 further comprises a vaporizing conduit 49 opening both into the interior space 43 of the casing 41 and outside of the spraying device 40.

The vaporizing conduit 49 comprises an outlet 51 formed in the vaporizing nose 48 and opening outside, a channel 59 extending in the vaporizing nose 48 from the outlet 51 to the interior space 43 of the casing 41, and a plunging tube 58 having a first end 64 connected to the outlet 51 thanks to the channel 59 and a second end 65, opposite to the first end 64, which is immersed in the liquid composition 50 contained in the casing 41.

The plunging tube 58 is configured so that the second end 65, which is immersed in the liquid composition 50, is very close to the bottom wall 44 and may face the latter.

The spraying device 40 further comprises a valve member 60 having a closed state and an opened state and an actuator 63 for controlling the state of the valve member 60.

The control unit 2 is here configured to control the valve member 60 thanks to the actuator 63, to put the valve member 60 in the respective closed position or opened position.

The valve member 60 further comprises a duct 61 extending towards the rigid casing 41 and opening into the interior space 43 of the latter, by virtue of an orifice (not represented) formed in the cylindrical lateral wall 42.

The orifice of the casing 41 is formed close to the collar 46, at the opposite of the bottom wall 44, so that the duct 61 opens in the casing 41 at a place where the interior space 43 is devoid of a liquid coating composition 50.

In other words, the duct 61 does not open in the liquid coating composition 50, when the casing 41 is placed in an upright position in a given machine.

The spraying device 40 further comprises a propelling member 52 configured to pressurize the liquid coating composition, the valve member 60 being interposed between and connected both to the propelling member 52 and to the casing 41.

The propelling member 52 comprises a closed tank 53 configured to contain in an internal area 56 a pressurized gas 57.

The pressurized gas 57 has here a pressure value which is higher than a pressure value in the internal space 43 of the casing 41.

The pressurized gas 57 may be one of any inert gas such as N2, Ar, CO2 . . . etc The closed tank 53 has a neck portion 55 which is fastenened to the valve member 60 thanks to a linking interface 62 of the latter.

The valve member 60 is configured, in its closed state, to prevent a fluidic communication between the propelling member 57 and the casing 41 and is also configured, by contrast in its opened state, to allow the fluidic communication between the propelling member 57 and the casing 41.

When the casing 41 contains the liquid coating composition 50, the propelling member 57 is in an operative state and the valve member 60 is in the opened state, therefore the spraying device 40 is configured to carry out the coating treatment.

Here, the closed tank 53 of the propelling member 57 contains a pressurized gas 57 so that the propelling member in the operative state.

When the valve member 60 is controlled and admits its opened state, the pressurized gas 57 flows through the valve member 60 and the duct 61, enters into the interior space 43 of the casing 41 and acts on the liquid coating composition 50 contained in the interior space 43 by pushing thereon.

Therefore, the liquid composition is very quickly pushed and vaporized in the plunging tube 58 of the vaporizing conduit 49.

Figure 6:
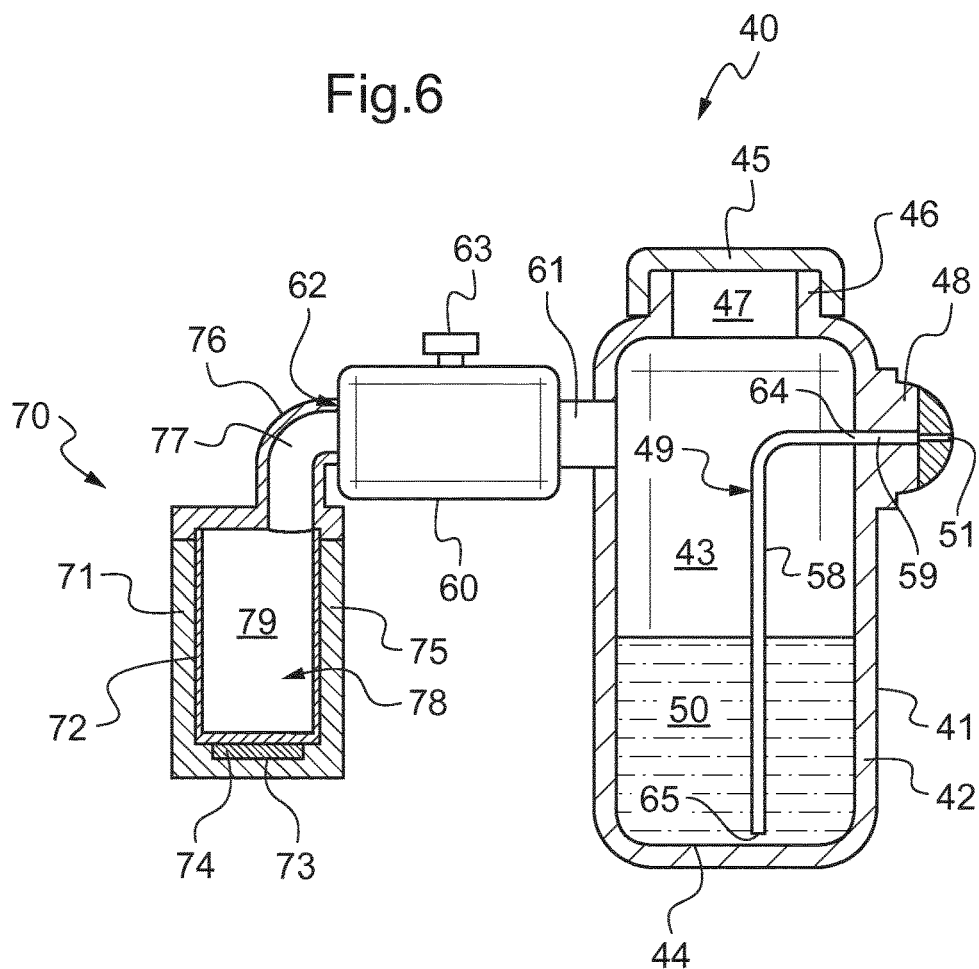
FIGS. 6 and 7 are similar views to those of FIGS. 4 and 5, showing a first variant of the coating device.
Figure 7:
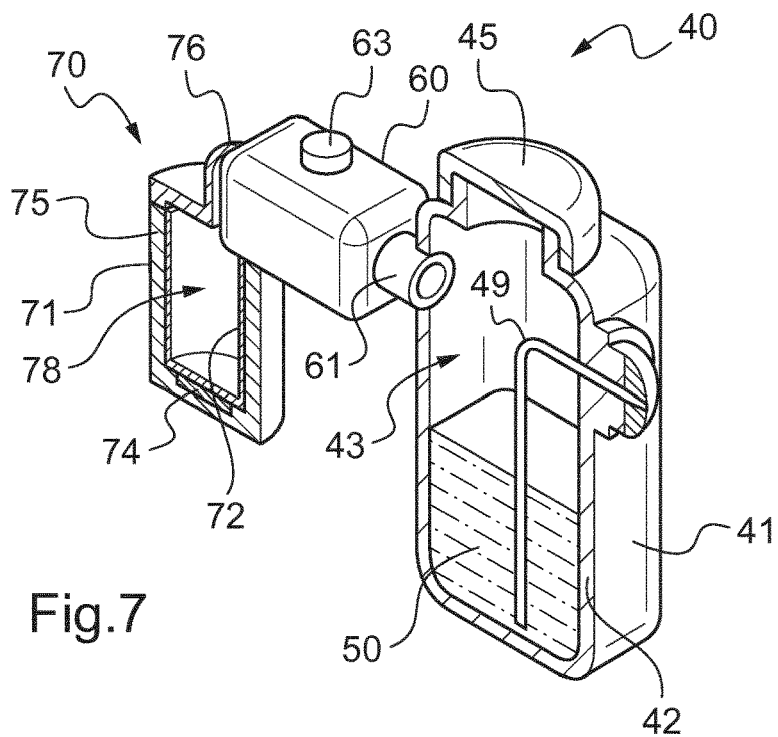

The vaporized coating composition troughs the channel 59 and is expulsed outside the casing 41 by the outlet 51, where the coating composition is nebulized into a mist of aerosol droplets which are directed towards the spectacle lenses 28.

FIGS. 6 and 7 show a variant of the spraying device illustrated in FIGS. 4 and 5.

The rigid casing 41 illustrated in FIGS. 6 and 7 is identical to the rigid casing illustrated in FIGS. 4 and 5.

The valve member 60 illustrated in FIGS. 6 and 7 is also identical to the valve member illustrated in FIGS. 4 and 5.

The spraying device 40 illustrated in FIGS. 6 and 7 differs from the spraying device illustrated in FIGS. 4 and 5 in that the propelling member 70 has a body 71 comprising a main part 75 being of a U-shaped and defining an internal area 78, and an outlet conduit 76 defining a channel 77 communicating with the internal area 78.

The internal area 78 of the main part 75 is configured to contain a gas 79, unpressurized or in variant pressurized, and forms an expansion chamber 78.

The gas 79 may be one of any inert gas such as N2, Ar, CO2 . . . etc.

The outlet conduit 76 is fastened to the valve member 60 thanks to the interface 62.

The propelling member 70 further comprises a heating module configured to heat the expansion chamber 78 such that the gas 79 acquires a pressure value which is higher than a pressure value in the casing 41.

The heating module comprises a conductive frame 72 being here of a U-shape and which is introduced in the main part 75 of the body 71, and a heating element 74 housed in a recess 73 formed in the main part 75 and in thermical contact with the conductive frame 72.

The heating element 74 may be autonomous or configured to be controlled by the control unit 2 of the system 1 for heating the conductive frame 72 and therefore the expansion chamber 78, in order to bring the propelling member 70 in an operative state.

The heating element may comprise for example an induction circuit configured to be heated and to receive energy by induction from a contactless energy source located in the machine.

In a variant, the machine may comprise an activation source which supplies a resistance forming the heating element. The transmission of energy from the activation source to the resistance is done using energy collectors, such as contact electrodes or pins housed in the spraying device and configured to enter in contact with corresponding contactors in the machine; or a RFID circuit configured to gather energy from a contactless energy source located on the machine.

The dimensions of the heating element and/or of the energy collector, and thus their energy output may be specifically determined in spraying device so that the spraying device is configured to provide to the gas a specific pressure in a given duration. Thus, in those cases, the machine may be configured to provide a single energy output independently of the spraying device used, the features and dimensions of the heating element or of the energy collector of the spraying device regulating the amount of energy fed to the gas and controlling the expansion of the gas.

Similarly to the spraying device described in reference to FIGS. 4 and 5, the spraying device 40 illustrated in FIGS. 6 and 7 is configured so that, when the casing 41 contains the liquid coating composition 50, the propelling member 70 is in an operative state and the valve member 60 is in the opened state, therefore the spraying device 40 is configured to carry out the coating treatment.

Here, as mentioned above, the expansion chamber 78 is heated by the heating module in order to pressurized the gas 79 and bring the propelling member 70 in the operative state.

When the valve member 60 is controlled and admits its opened state, the pressurized gas 79 flows through the channel 77, the valve member 60 and the duct 61, enters into the interior space 43 of the casing 41 and acts on the liquid coating composition 50 contained in the interior space 43 by pushing thereon.

Therefore, the liquid composition is very quickly pushed and vaporized in the plunging tube 58 of the vaporizing conduit 49.

The vaporized coating composition troughs the channel 59 and is expulsed outside the casing 41 by the outlet 51, where the coating composition is nebulized into a mist of aerosol droplets which are directed towards the spectacle lenses 28.

Here, the valve member is only optional because the gas 79 in the propelling member is in a non-pressurized state prior to heating. However, using such a valve member enables to build-up a predetermined pressure inside the propelling member before opening the valve, which can lead to a more abrupt expulsion of the coating composition out of the spraying device.

In a variant that is not illustrated, the propelling member comprises a chamber configured to contain a liquid rather than a gas, and a heating module configured to heat the liquid for vaporising it and for obtaining a gas having a pressure value which is higher than a pressure value in the casing.

Figure 8:
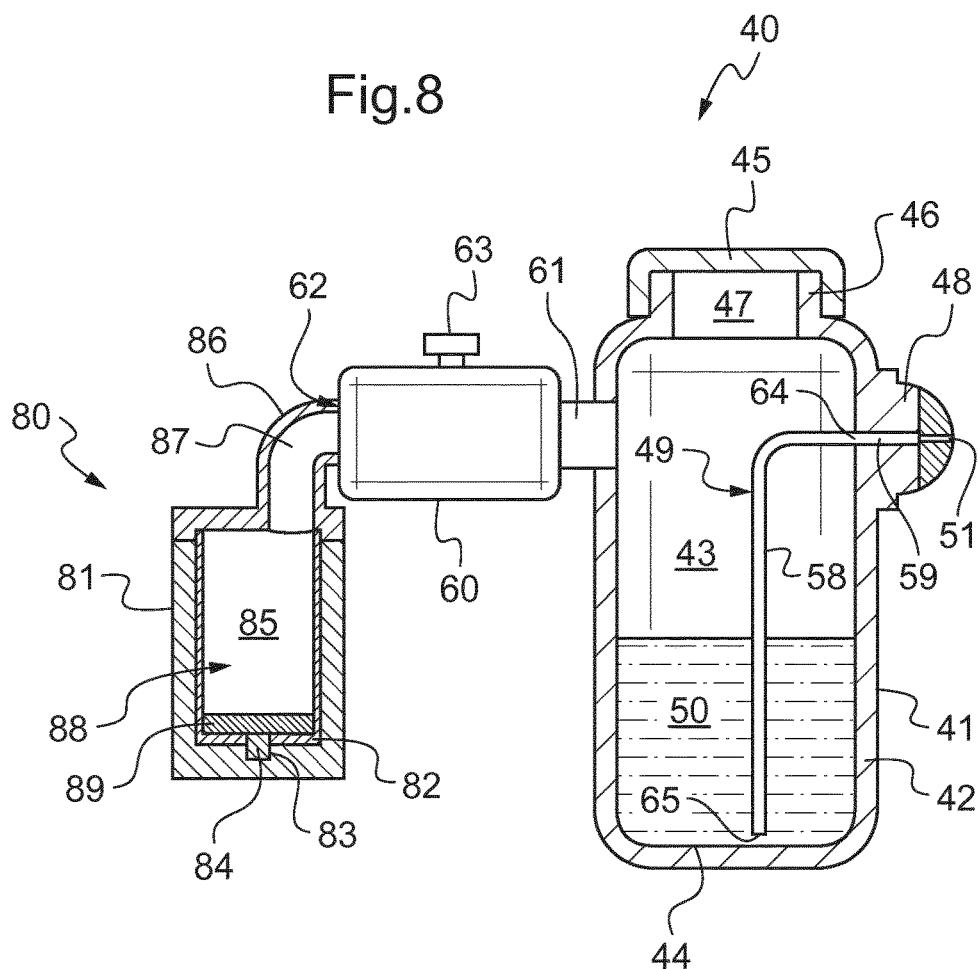
FIGS. 8 and 9 are also similar views to those of FIGS. 4 and 5, showing a second variant of the coating device.
Figure 9:
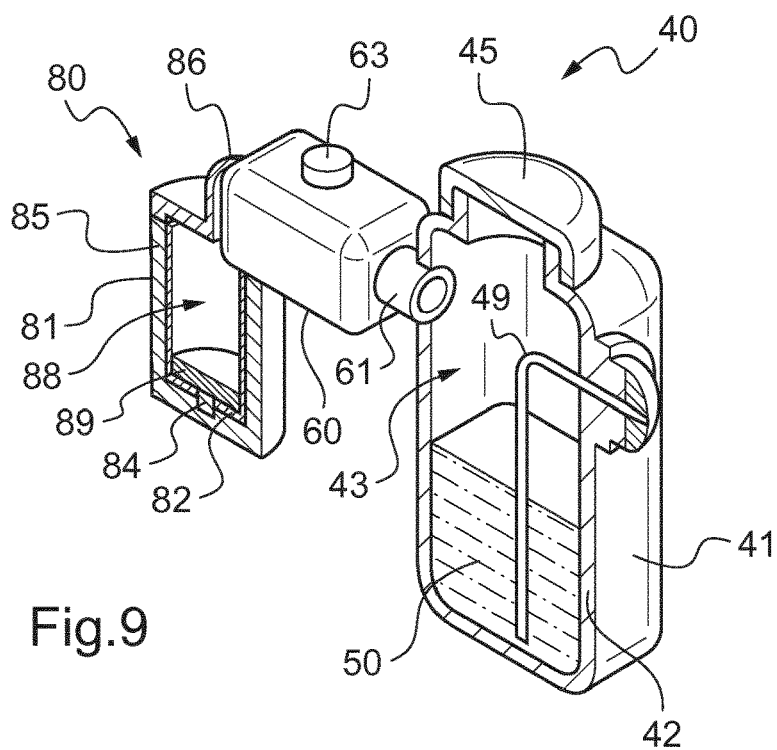

FIGS. 8 and 9 show another variant of the spraying device illustrated in FIGS. 4 and 5.

The rigid casing 41 illustrated in FIGS. 8 and 9 is identical to the rigid casing illustrated in FIGS. 4 and 5.

The valve member 60 illustrated in FIGS. 8 and 9 is also identical to the valve member illustrated in FIGS. 4 and 5. However, the valve member may be only optional, and/or the valve member may be controlled in order to be in open state as soon as the cartridge is located in the chamber.

The spraying device 40 illustrated in FIGS. 8 and 9 differs from the spraying device illustrated in FIGS. 4 and 5 in that the propelling member 80 has a body 81 comprising a main part 85 being of a U-shaped and defining an internal area 88, and an outlet conduit 86 having a shape of flue and defining a channel 87 communicating with the internal area 88.

The internal area 88 of the main part 85 is configured to contain a gas 85, unpressurized or in variant pressurized, and forms a chamber 88.

The outlet conduit 86 is fastened to the valve member 60 thanks to the interface 62.

The propelling member 80 further comprises an explosive module configured to quickly pressurize the gas 85 in the chamber 88 at a pressure value which is higher than a pressure value in the casing 41.

The explosive module comprises a frame 82 being here of a U-shape and which is introduced in the main part 85 of the body 81, an explosive element 89 (or material) disposed in the bottom of the frame 82, and an explosive primer 84 housed in a recess 83 formed in the main part 85 and configured to explode the explosive element 89.

The explosive primer 84 may be autonomous or configured to be controlled by the control unit 2 of the system 1 for exploding the explosive element 89 such that the chamber 88 has an internal pressure value which is higher than a pressure value in the casing 41, in order to bring the propelling member 80 in an operative state.

The explosive element 89 may be for example a mixture of Methane and dioxygen that can be ignited by an electrical spark for form a low-energy explosion.

The control unit 2 of the system 1 may control the explosive primer 84 by means of a resistance, a capacitance enabling spark creation or an induction circuit which can be alimented through contactless circuit or through contacts or pins housed in the spraying device and configured to enter in contact with corresponding contactors in the machine; or a RFID circuit configured to gather energy from a contactless energy source located on the machine.

Similarly to the spraying device described in reference to FIGS. 4 and 5, the spraying device 40 illustrated in FIGS. 8 and 9 is configured so that, when the casing 41 contains the liquid coating composition 50, the propelling member 80 is in an operative state and the valve member 60 is in the opened state, therefore the spraying device 40 is configured to carry out the coating treatment.

Here, as mentioned above, the internal pressure in the chamber 88 is increased by explosion of the explosive element 89 in the chamber 88 in order to pressurized the gas 85 and bring the propelling member 80 in the operative state.

When the valve member 60 is controlled and admits its opened state, the pressurized gas 85 flows through the channel 87, the valve member 60 and the duct 61, enters into the interior space 43 of the casing 41 and acts on the liquid coating composition 50 contained in the interior space 43 by pushing thereon.

Therefore, the liquid composition is very quickly pushed and vaporized in the plunging tube 58 of the vaporizing conduit 49.

The vaporized coating composition troughs the channel 59 and is expulsed outside the casing 41 by the outlet 51, where the coating composition is nebulized into a mist of aerosol droplets which are directed towards the spectacle lenses 28.

More generally, the liquid coating composition in the casing may be replaced by a gas coating composition received in the casing.

In this case, the casing can be devoid of a plunging tube, and the pressurized gas of the propelling member pushes the (unpressurized) gas coating composition towards the vaporizing nose so that the pushed gas coating composition is vaporized outside the casing.

Further in this case, the casing may comprise an activator in the internal space which is configured for activating the gas coating composition.

In a variant that is not illustrated, the spraying device, or more generally the coating device, comprises a single piece, for instance a piston, acting as a propelling member. In such case, a valve member may not be necessary.

Such a piston may be located directly in the internal space of the casing, thus delimiting a first chamber for the actuator of the piston and a second chamber for receiving the predetermined coating composition (liquid or gas).

The first and second chambers are advantageously located in the single casing in order to form the cartridge.

The actuator of the piston may be formed like the propelling members describes above (for instance gas to be heated, explosive member) or may be formed like a mechanical actuator which is controlled by the control unit.

When actuator is controlled, the piston moves in the second chamber of the single casing and pushes the liquid coating composition contained therein. Therefore, the liquid composition is very quickly pushed and vaporized in the plunging tube of the vaporizing conduit. The vaporized coating composition troughs the channel and is expulsed outside the casing by the outlet, where the coating composition is nebulized into a mist of aerosol droplets which are directed towards the spectacle lenses.

In a variant that is not illustrated, the coating composition may be placed in a casing which is not rigid but rather flexible, deformable but not elastic (not a rubber).

It will be noted that in all the embodiments and/or variants of the coating device described above, the propeller member may be preconfigured according to the predetermined coating composition to be vaporize, and inversely.

This is here particularly convenient because both the predetermined coating composition and the propeller device are housed in the same single cartridge unit, and thus are not independently provided. The settings of the system may also be simpler to implement.

This cartridge may also be previously prepared for a determined treatment, according to some structural parameters of the chamber which is configured to receive the cartridge, for instance by taking in consideration the distance between a support for the cartridge and a support for the optical article.

In particular, the vaporizing conduit and/or the casing and/or the propelling member may be configured according to parameters of the chamber and/or of the optical article to coat and/or of the coating composition to vaporize.

On the contrary, the cartridge may be prepared independently from the parameters relating for instance to the chamber and more generally relating to the system.

It may be convenient to provide a set of prepared cartridges which are of the standard type, the prepared cartridges being distinct from each other by the propelling member contained and/or by the coating composition contained.

It may be convenient to provide a set of semi-prepared cartridges which are of the semi-standard type, the semi-prepared cartridges being modular and having prepared modules formed for instance by a prepared casing containing a coating composition and by a prepared propelling member which can be assembled together. Such system may thus comprise different coating composition modules that may be combined to a single type of propelling member, or the any one of a multiplicity of propelling member modules, at least one propelling member module being different form another propelling member, in for instance a rate of expulsion, an applied energy . . . etc.

Thus, a user of the system as described above may select one cartridge amongst a plurality of prepared cartridges and use it, or may select one cartridge amongst a plurality of semi-prepared cartridges, next assemble the prepared modules and next use the assembled cartridge.

The cartridge according to the invention is further easy to handle and safe.

The cartridge may be disposable or may be recharged in order to be reutilized.

In a convenient way, the system 1 is thus configured to be provided to an eye-care professional, or optician hereafter, who can use said system 1 when the wearer of the spectacle lenses 28 comes in his shop.

The spectacle lenses 28 here comprises an ophthalmic lens substrate on which are coated firstly an anti-reflective coating layer and secondly an initial anti-soiling coating layer (which forms a topcoat).

If the effects of the initial anti-soiling layer are decreased, which can be the case after a few months of wearing, the optician can recoat a new anti-soiling layer on the spectacle lenses 28.

In a variant, the initial coating layer is not an anti-soiling coating but an anti-fogging coating. After winter, the wearer may wish to replace the anti-fogging coating by an anti-soiling coating.

Figure 10:
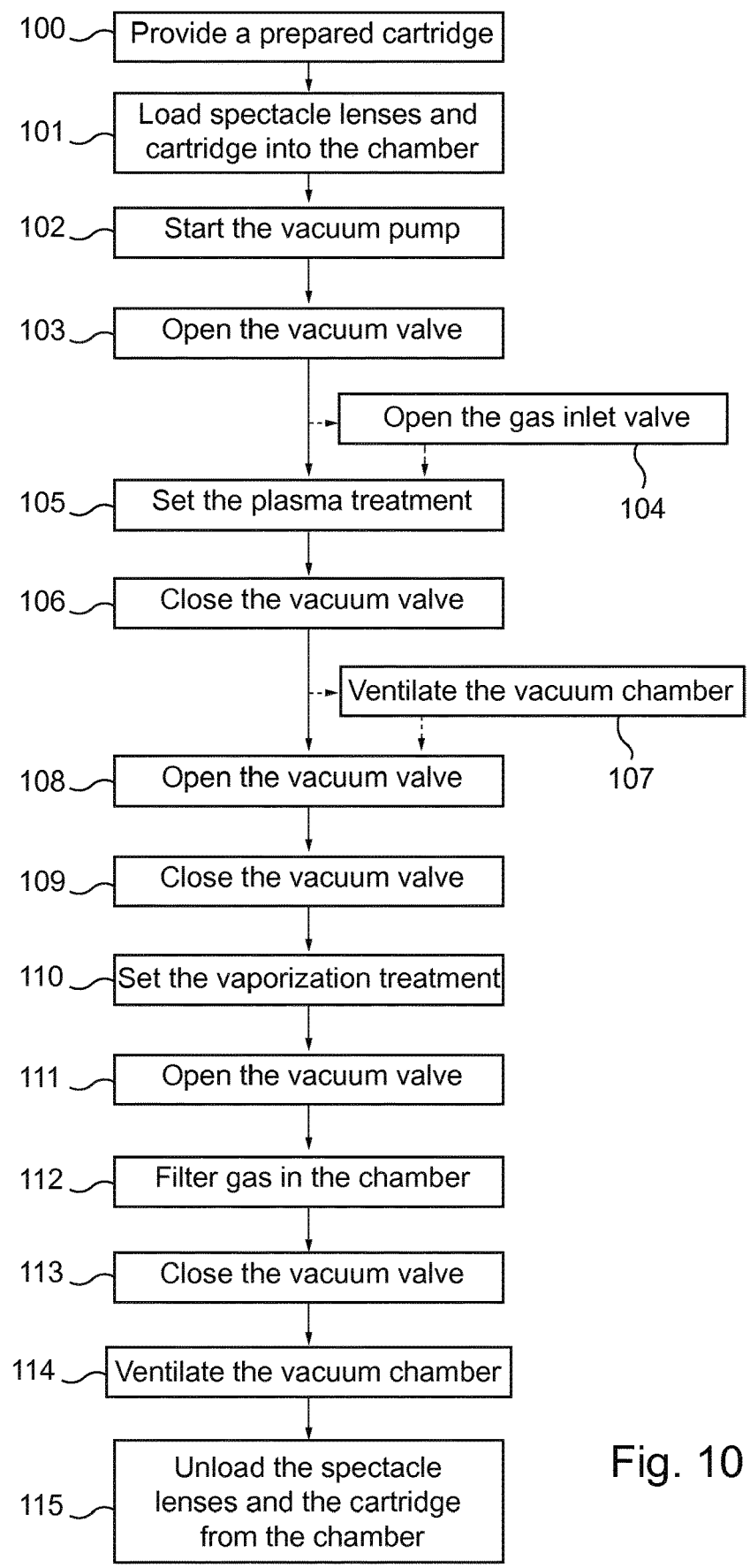
FIG. 10 is a block diagram illustrating steps for using the system for recoating an optical article according to an embodiment.

We will now describe in details the method for using the machine 1 in order to recoat the spectacle lenses 28 with an anti-soiling coating composition, in reference to FIG. 10.

For that purpose, the user takes the spectacle lenses 28 and selects the adapted cartridge 40 for the recoat treatment, the cartridge 40 including the predetermined coating composition (step 100 of providing the cartridge).

In a variant, the user introduces in the casing of the cartridge 40 a determined volume of the composition.

In another variant, the user selects coating composition module with the adequate amount of a chosen coating composition, selects a propeller module corresponding to the amount of said coating composition and assembles both modules into a cartridge.

The user opens the door 9 of the vacuum chamber 8 and at step 101 loads the spectacle lenses 28 and preferably the cartridge on the support 27. The lenses are here for instance finished lenses of 65 mm diameter, or lenses already cut to the shape of the frames or even spectacles comprising a frame and lenses installed in the frame.

The optician closes the door 9 of the vacuum chamber 8.

Next, the optician starts the treatment program for recoating the spectacle lenses 28 via the keyboard 7 and the graphic interface 6.

The control unit 2 then takes over the recoat treatment.

The vacuum pump 20 is started at step 102 and the vacuum valve 19 is opened at step 103 in order to connect (a flow connection) the vacuum pump 20 to the vacuum chamber 8 for evacuating the interior space 31 of the vacuum chamber 8 via the outlet circuit 15. The vacuum pump 20 is thus able to suck the gases from the vacuum chamber 8.

The control unit 2 waits and takes pressure measurements via the pressure sensor 17 until the vacuum chamber pressure reaches a predetermined pressure, for instance about 0.4 mbar.

Optionally the gas inlet valve 13 is then opened at step 104 in order to allow gas to enter in the vacuum chamber 8 via the inlet circuit 12 to have a stable pressure in the vacuum chamber 8.

The gas is here atmospheric air.

The evacuation time of the vacuum chamber 8 is for instance approximately 120 s.

The plasma generator 11 is then set at step 105 with a predetermined power and for a predetermined time in order to carry out the vacuum plasma treatment for removing the initial outermost anti-soiling coating on the spectacle lenses 28, the effects of which have decreased.

Here, the plasma generator power is for instance about 50-200 W (5-20 W/L according to the volume of the vacuum chamber 8 which is here 10 L) and the time of the plasma treatment is for instance approximately equal to 120 s.

The vacuum plasma treatment allows removal of all the initial outermost coating of the spectacle lenses 28 without damaging the anti-reflective coating.

Further, the plasma treatment allows activation of the surfaces 35 and 36 of the spectacle lenses 28, in particular the anti-reflective coating in order to increase the adherence properties.

The vacuum valve 19 is then closed at step 106 in order to disconnect (a flow interruption) the vacuum pump 20 from the vacuum chamber 8. The vacuum pump 20 is thus able not to suck the gases from the vacuum chamber 8.

During the plasma treatment, the gases sucked by the vacuum pump 20 are filtered by the filtering device 23 before exhausting to the atmosphere.

At this stage of the recoat treatment, the control unit 2 optionally implements a venting step 107, depending on the required pressure for nebulization. The inlet valve 33 is opened for a predetermined time, for instance 10-20 s, in order to vent the vacuum chamber 8 and raise the pressure in the chamber 8. The inlet valve 33 is then closed to end the venting step.

Next, the vacuum valve 19 is opened at step 108 in order to reconnect (a flow connection) the vacuum pump 20 to the vacuum chamber 8 for evacuating said vacuum chamber 8. The vacuum pump 20 is thus able to suck the gases from the vacuum chamber 8.

The vacuum valve 19 is opened for a predetermined time, for instance about 20 s, until the vacuum chamber pressure reaches a required pressure for vaporization.

The required pressure for vaporization depends on the material to vaporize. More generally, the pressure of the interior space of the vacuum chamber 8 is for instance comprised between 100 mbar and 0.01 mbar or less.

The control unit 2 is configured to control the pressure in the vacuum chamber 8 by taking measurements with the pressure sensor 17.

The vacuum valve 19 is closed and the control unit is configured to carry out the vaporization treatment at step 110.

More precisely, as descried above, the control unit is configured, if necessary, to put the propelling member 70, 80 in the operative state by acting on the heating element 74 or on the explosive primer 84.

When the propelling member 52, 70, 80 is in the operative state, the control unit 2 is configured to act on the valve member 60 to put the latter in its opened state for allowing the fluidic communication between the propelling member 52, 70, 80 and the casing 41.

In variant, the control unit 2 is configured to act directly on a piston located in the casing (as described above).

The coating composition 50 is thus vaporized and directed towards the spectacle lenses 28.

More generally, the vacuum pump 20 may be able to suck or not to suck the gases from the vacuum chamber 8 during the vaporization treatment.

During the vaporizing treatment, the coating composition is vaporized in the vacuum chamber 8 and the vaporized composition is deposited on the spectacle lenses 28.

Next, the vacuum valve 19 is opened at step 111 in order to reconnect (a flow connection) the vacuum pump 20 to the vacuum chamber 8 for evacuating said vacuum chamber 8, and in particular for evacuating the gases emitted during the vaporization treatment because such gases might be toxic. The vacuum pump 20 is thus able to suck the gases from the vacuum chamber 8.

The gases are sent from the vacuum pump 20 to the filtering device 23 where the gases are filtered at step 112. The filtering step 111 is carried out for a predetermined time, for instance about 120 s.

The vacuum valve 19 is then closed at step 113 so that the vacuum pump 20 is disconnected (a flow interruption) from the vacuum chamber 8. The vacuum pump 20 is thus able not to suck the gases from the vacuum chamber 8.

As in step 107, a venting step 114 is carried out equilibrating the chamber pressure with atmospheric pressure. The venting step 114 is identical to the venting step 107.

The gas inlet valve 33 is opened for a predetermined time, for instance 60 s, in order to vent the vacuum chamber 8 and the gas inlet valve 13 is then closed.

Optionally, the venting step 114 may be used as a drying step for evaporating the solvent that might contain the liquid composition deposited on the lenses.

Optionally, a polymerization step may be carried out, depending on the adhesion composition used. The polymerization might not need any external source and naturally happens, due to the thinness of the deposited coating and the high surface energies involved. In variant, the polymerization might need activation and the control unit thus activates the polymerization device and set with a predetermined power and for a predetermined time in order to polymerize the universal adhesion coating. Such polymerization device might be a UV lamp in case the deposited liquid comprises photo activators mixed with photo activated monomers or photopolymers, or the polymerization device might be a IR lamp or might even be the plasma generator in some cases.

It will be noted that the drying step and the polymerization step can be carried out in the same time, or successively.

The recoat treatment is thus finished.

The optician opens the door 9 of the vacuum chamber 8.

There is no risk because all the toxic gases have been filtered and the air during the treatment has been exhausted.

At step 115 the optician unloads the spectacle lenses 28 which are recoated with a new anti-soiling coating.

The optician washes the spectacle lenses 28 with a cleaning solution, such as IPA ("isopropyl alcohol or iso-propanol").

In particular, the topcoat may be one of an antifouling composition, an anti-fog composition. Alternatively the topcoat might be a polymeric layer, called bond coat hereafter, that can be deposited in order to improve the deposition performances of a topcoat layer. In particular when one desires to deposit such topcoat on top of a lens surface of unknown origin, one may need the deposition of a universal adhesion layer.

The bond coat that may be interposed between the outermost coating and the topcoat comprises at least one adhesion promoter. As mentioned above, this adhesion promoter comprises, and preferably consists in, (i) a —SiXYZ head group, wherein X, Y and Z are independently chosen from an halogen atom or an —OR group wherein each R is independently a linear alkyl having from 1 to 6 carbon atoms or a branched alkyl having from 3 to 6 carbon atoms, (ii) a reactive end group which is able to react, optionally after a physical, chemical or physic-chemical treatment, with at least one function carried by at least one compound included in a topcoat composition, and (iii) a spacer that links the head and end groups.

The reactive end group is preferably any of the following groups: amino, hydroxyl, thiohydroxy, acetamido, halogeno, halogenosilane, alcoxysilane, acetoxysilane, epoxy, thioepoxy, aldehyde, alkyne, carboxyl or a group which may be converted into one of those by chemical reaction, for instance an ether, thioether, alkene, ketone or carboxylic acid ester group.

The adhesion promoter is preferably such that at least one, and preferably all, the following conditions are satisfied:
  the —SiXYZ head group is chosen from mono-, di- and tri-alcoxy silane groups, preferably tri-alcoxysilane groups, and the alcoxy group is chosen from methoxy and ethoxy groups;
  the spacer is a linear alkylene chain having from 1 to 10 carbon atoms or a branched alkylene chain having from 3 to 10 carbon atoms, wherein up to 3 carbon atoms may be substituted by an oxygen atom or a sulphur atom, preferably a linear alkylene chain having from 2 to 4 carbon atoms; and
  the reactive end group is chosen from the group consisting of amino, hydroxyl, thiohydroxy, acetamido, halogeno, halogenosilane, alcoxysilane, acetoxysilane, epoxy, thioepoxy, aldehyde, alkyne, carboxyl, ether, thioether, alkene, ketone and carboxylic acid ester groups, preferably amino or epoxy groups.

The adhesion promoter may have a molecular weight between 150 and 1000 g/mol and preferably between 165 and 450 g/mol.

Examples of adhesion promoters are 3-amino-propyltrimethoxysilane (APTMS), 3-aminopropyltriethoxysilane (APTES), 3-aminopropyl-tris(methoxyethoxyethoxy) silane, acetamido propyltrimethoxysilane, γ-glycidoxypropyl trimethoxysilane (GLYMO), γ-glycidoxypropyltriethoxysilane, and mixtures thereof.

The bond coat usually consists in the adhesion promoter, and does not contain any other compound besides the impurities optionally present in the adhesion promoter as a result of its synthesis.

The bond coat generally has a thickness ranging from 1 nm to 100 nm.

The bond coat composition may be applied onto the outermost organic coating by vacuum evaporation or by spray deposition. Various evaporation devices can be used in accordance with the process of the invention, such as devices based on ion or electron beam heating methods, devices based on high-frequency heating method, devices based on optical heating method (for example such device comprising a tungsten lamp), a Joule effect device or resistance heating device, and more generally any heating device which provides sufficient heat to evaporate the liquid coating material. Those devices are well known in the art.

The anti-fouling top coats preferably used in this invention are those which reduce surface energy of the optical article to less than 14 mJ/m². The invention has a particular interest when using anti-fouling topcoats having a surface energy of less than 13 mJ/m² and even better less than 12 mJ/m². These surface energy values are calculated according to Owens Wendt method described in the following document: Owens, D. K.; Wendt, R. G. "Estimation of the surface force energy of polymers", J. Appl. Polym. Sci. 1969, 51, 1741-1747.

The anti-fouling top coat according to the invention is preferably of organic nature. By organic nature, it is meant a layer which is comprised of at least 40% by weight, preferably at least 50% by weight of organic materials, relative to the total weight of the coating layer. A preferred anti-fouling top coat is made from a liquid coating material comprising at least one fluorinated compound, bearing in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in U.S. Pat. No. 4,410,563, EP 0 203 730, EP 0 749 021, EP 0 844 265 and EP 0 933 377.

Preferred fluorinated compounds are silanes and silazanes bearing at least one group selected from fluorinated hydrocarbons, perfluorocarbons, fluorinated polyethers such as $F_3C$—$(OC_3F_6)_{24}$—O—$(CF_2)_2$—$(CH_2)_2$—O—$CH_2$—Si$(OCH_3)_3$ and perfluoropolyethers, in particular perfluoropolyethers.

Among fluorosilanes there may be cited the compounds of formulae:

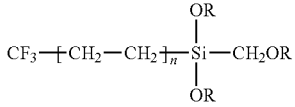

wherein n=5, 7, 9 or 11 and R is an alkyl group, typically a $C_1$-$C_{10}$ alkyl group such as methyl, ethyl and propyl; $CF_3CH_2CH_2SiCl3$; $CF_3$—$CF_2$—$(CH_2CH_2)_{n'}$—$SiCl3$; and

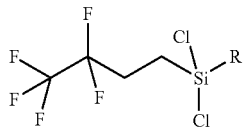

wherein n'=7 or 9 and R is as defined above.

Compositions containing fluorinated compounds also useful for making hydrophobic and/or oleophobic top coats are disclosed in U.S. Pat. No. 6,183,872. The silicon-containing organic fluoropolymer of U.S. Pat. No. 6,183,872 is represented by the below general formula and has a number average molecular weight of from $5.10^2$ to $1.10^5$.

Others examples of compounds are of formulae:

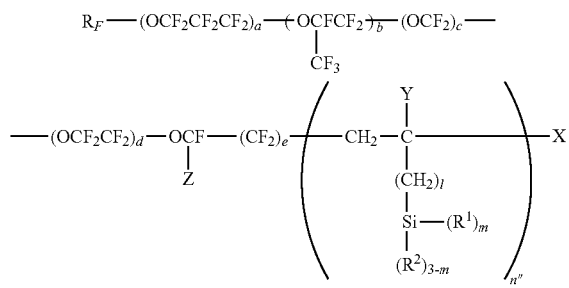

wherein RF represents a perfluoroalkyl group, Z represents a fluorine atom or a trifluoromethyl group, a, b, c, d and e each independently represent 0 or an integer equal to or higher than 1, provided that a+b+c+d+e is not less than 1 and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; R1 represents a hydroxyl group or a hydrolyzable substituent group; R2 represents a hydrogen atom or a monovalent hydrocarbon group; l represents 0, 1 or 2; m represents 1, 2 or 3; and n" represents an integer equal to or higher than 1, preferably equal to or higher than 2.

Other preferred compositions for forming the anti-fouling topcoat are those containing compounds comprising fluorinated polyether groups, in particular perfluoropolyether groups. A particular preferred class of compositions containing fluorinated polyether groups is disclosed in U.S. Pat. No. 6,277,485. The anti-fouling top coats of U.S. Pat. No. 6,277,485 are at least partially cured coatings comprising a fluorinated siloxane prepared by applying a coating composition (typically in the form of a solution) comprising at least one fluorinated silane of the following formula:

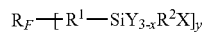

wherein $R_F$ is a monovalent or divalent fluorinated polyether group, $R^1$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R^F$ is monovalent) or 2 ($R^F$ is divalent). Suitable compounds typically have a molecular weight (number average) of at least about 1000. Preferably, Y is a lower alkoxy group and $R^F$ is a fluorinated polyether group.

Commercial compositions for making anti-fouling top coats are the compositions KY 130 and KP 801 M commercialized by Shin-Etsu Chemical and the composition OPTOOL DSX (a fluorine-based resin comprising perfluoropropylene moieties) commercialized by Daikin Industries. OPTOOL DSX is the most preferred coating material for anti-fouling top coats.

The anti-fog topcoat usually consists in a hydrophilic coating, which provides a low static contact angle with water, preferably of less than 50°, more preferably of less than 25°. These coatings are generally made of highly hydrophilic species such as sulfonates or polyurethanes.

Commercially available products comprise several micrometer-thick hydrophilic layers.

The anti-fog coating may be a permanent anti-fog coating, which is a coating which hydrophilic properties result from hydrophilic compounds permanently bound to another coating or support. Such coatings are for example described in EP 1 324 078, U.S. Pat. Nos. 6,251,523 and 6,379,776.

Alternatively, the antifog coating may be a temporary antifog coating resulting from the application of a hydrophilic solution onto the surface of an antifog coating precursor.

For instance, EP 1 275 624 describes a lens coated with a hard, inorganic, hydrophilic layer based on metal oxides and silicon oxide. Its hydrophilic nature and the presence of nanosized concave portions on the surface thereof enable to impregnate a surfactant and to retain the same adsorbed over a long period of time, thus maintaining an antifog effect for several days. However, an antifog effect can also be observed in the absence of any surfactant.

The antifog coating precursor used for example in EP 1 276 624 is generally obtained from a composition comprising an organic compound comprising a hydrophilic group such as polyoxyethylene, a reactive group chosen from an alkoxysilane Si(OR)n, a silanol SiOH or isocyanate groups, and optionally a fluorinated hydrophobic group. The composition is chosen so that the static contact angle with water of the antifog coating precursor varies from 50° to 90°. The organic compounds used in the antifog coating precursor preferably have a molecular weight ranging from 700 to 5000 or from 430 to 3700 g/mol. To be mentioned as examples of such compounds are the CH3O(CH2CH2O) 22CONH(CH2)3Si(OCH3)3 or C8F17O(CH2CH2O) 2CONH(CH2)3-Si(OCH3)3 compounds. The antifog coating precursor is generally 0.5 to 20 nm thick.

Another antifog coating precursor is described in WO 2011/080472. This antifog coating precursor is obtained through the grafting of at least one organosilane compound possessing both a polyoxyalkylene group comprising less than 80 carbon atoms, and at least one silicon atom carrying at least one hydrolyzable group. It has a thickness lower than or equal to 5 nm and a static contact angle with water of more than 10° and of less than 50°.

The solution which is preferably deposited to provide the surface of the antifog coating precursor with antifogging properties is the commercially available solution of Defog It™ or silicone polyethylene oxide (SiPEO] such as provided by Gelest.

The antifogging properties, especially the durability of the antifogging effect associated with the antifog coating precursor described in WO 2011/080472, are very satisfactory.

The topcoat may be a complex hybrid compound, comprising for instance metallic or mineral particles or nanoparticles. It might comprise monomers or mix of monomers in order to form polymeric materials. It might even comprise active compounds such as dyes, photochromic dyes, electrochromic materials, liquid crystals . . . etc.

The predetermined liquid coating composition to be deposited may be any sprayable liquid solution. In most cases, to render the compound sprayable, it is useful to provide the needed compounds in a solvent: for instance water, or ethanol, or methanol, or HFE7100 or other solvents.

The predetermined liquid coating composition has a concentration of compound into the solvent which might vary from 0.1% up till 100%.

The predetermined liquid coating composition has a concentration of compound vs. solvent which depend on the viscosity of solvent and compound and/or of the vaporization pressure at ambient temperature of the solvent.

The viscosity of the predetermined liquid coating composition to be sprayed might depend on the solvent used if any; and one main objective of the use of solvent is to enable the solution to have a viscosity low enough so that it may attain a speed at which it is nebulized when propelled out of the cartridge.

The necessary volume of predetermined coating composition may vary depending on the final thickness of material needed, the concentration of material in the solution, the concentration of compound in the solution and the amount of material that is vaporized outside of the surface to be treated.

The spraying device can comprise multiple outlet openings for instance for driving nebulized aerosol droplets into the chamber, providing multiple outputs into the chamber.

The coating device might be able to move into position and/or the chamber might comprise means to move the optical article to position it in front of the outlet opening of the coating device.

The distance between the outlet opening of the coating device and the optical article might be comprised between about 1 cm and about 10 cm, preferably between about 2 cm and about 8 cm, and more preferably between about 4 cm and about 6 cm.

The coating device can be used to deposit as little material out of the surface of the optical article to be covered as possible.

One may be able to adapt the shape of the outlet opening, the distance of projection, the exact vacuum pressure, the relative position and orientation of the projection pseudo-cone with the surface to be covered depending on the film deposited (compound and solvent), the material of the surface to be covered, the shape of the surface to be covered and the composition, the surface tension and for instance the viscosity of the sprayable liquid.

All those parameters may be manipulated in order either to adapt the liquid to the available machine or conversely adapt the machine to the solution available.

In a variant, the vacuum valve is not used to causing the vacuum pump to suck or not to suck gases from the vacuum chamber, but rather the control unit is configured to directly put on and put off the vacuum pump (flow connection and flow interruption).

In variants that are not illustrated:
- the machine does not comprise the plasma generator and/or the evaporation device and/or the polymerization device;
- the control unit of the machine is configured to control the coating device for depositing an adhesion coating and/or a topcoat on the optical article (without plasma treatment beforehand);
- the control unit of the machine is further configured to control the polymerization device to polymerize the vaporized and/or nebulized adhesion coating;
- the support is moveable and configured to select the distance between the optical article and the outlet opening of the coating device;
- the support is not disposed on the door of the chamber, but rather directly in the chamber;
- the machine comprises a first support configured for receiving the optical article and a second support distinct to the first support and configured for receiving the coating device;
- the filtering device is not placed after the vacuum pump, but rather between the vacuum pump and the vacuum chamber;
- the coating device is not loaded in the chamber at the same time as the spectacle lenses (before the vacuum plasma treatment), but rather after the plasma treatment and before the coating treatment;
- the pressure sensor is not connected to the outlet circuit via a branching point, but rather the pressure sensor is directly connected to the vacuum chamber; and/or
- the values of pressure, temperature and time are different, for instance the plasma treatment pressure is about 0.1-1 mbar rather than 0.3-0.35 mbar, the evaporation treatment pressure is about 1-1000 mbar rather than 50 mbar.

It should be noted more generally that the invention is not limited to the examples described and represented.

The invention claimed is:

1. A system for coating an optical article with a predetermined coating composition, comprising a chamber having an interior space configured to receive said optical article, a coating device configured to carry out a coating treatment of said predetermined coating composition for depositing it on said optical article in said chamber, by vaporizing said predetermined coating composition and by exposing at least a face of said optical article to the vaporized coating composition, and a control unit configured to control said coating device for coating said optical article by vaporizing said predetermined coating composition; said coating device being formed as a single cartridge unit, said coating device comprising a casing configured to contain said predetermined coating composition, a vaporizing conduit opening both into said casing and outside of said coating device, and a propelling member configured to pressurize said predetermined coating composition; said coating device being configured to put in fluidic communication said propelling member in an operative state with said casing in order to carry out said coating treatment; wherein:

said coating device further comprises a valve member which is interposed between and connected both to said propelling member and to said casing, said valve member having an opened state allowing said fluidic communication between said propelling member and said casing; and said propelling member comprises:
an expansion chamber configured to contain a gas, and a heating module configured to heat said expansion chamber such that said gas has a pressure value which is higher than a pressure value in said casing; or
a chamber configured to contain a liquid, and a heating module configured to heat said liquid for vaporising it and for obtaining a gas having a pressure value which is higher than a pressure value in said casing; or
a chamber configured to contain an explosive element, and an explosive primer configured to explode said explosive element such that said chamber has an internal pressure value which is higher than a pressure value in said casing.

2. The system according to claim 1, wherein said predetermined coating composition is a liquid composition, the coating device is a spraying device configured to carry out a spraying treatment of said predetermined liquid coating composition for depositing it on said optical article in said chamber, by nebulizing said liquid predetermined coating composition into a mist of aerosol droplets and by directing said droplets towards at least a face of said optical article; the control unit being configured to control said spraying device for coating said optical article with said predetermined liquid coating composition.

3. The system according to claim 1, wherein said casing is a rigid casing.

4. The system according to claim 1, wherein said predetermined coating composition is a liquid composition and said conduit comprises an outlet opening outside said coating device and a plunging tube having a first end connected to said outlet and a second end, opposite to said first end, which is immersed in said liquid composition contained in said casing.

5. The system according to claim 1, further comprising an initial treatment device configured to carry out an initial predetermined treatment of the optical article in said chamber, before coating said optical article with said initial predetermined coating composition, said control unit being configured to control said initial treatment device for treating an initial base coating of said optical article or a surface of said optical article.

6. The system according to claim 5, wherein said initial treatment device is a plasma generator configured to carry out a plasma treatment of said optical article in said chamber, said control unit is configured to control said plasma generator for removing an initial outermost coating of said optical article or for activating at least an external surface of said optical article.

7. The system according to claim 6, wherein said predetermined coating composition forms a topcoat on said optical article after said coating treatment, which topcoat is configured to bring a predetermined function to said optical article, selected amongst a list comprising an anti-soiling and an anti-fogging; or wherein said predetermined coating composition forms an universal ahesion coating on said optical article after said coating treatment, which universal ahesion coating is configured to receive a predetermined topcoat.

8. A coating device configured to carry out a coating treatment of a predetermined coating composition for coating an optical article in a chamber of a system according to claim 1, said coating device being formed as a single cartridge unit comprising a casing configured to contain said predetermined coating composition, a vaporizing conduit opening both into said casing and outside of said coating device, and a propelling member configured to pressurize said predetermined coating composition; said coating device being configured to put in fluidic communication said propelling member in an operative state with said casing in order to carry out said coating treatment; by virtue of which said predetermined coating composition may be vaporized and directed towards at least a face of said optical article; wherein
said coating device further comprises a valve member which is interposed between and connected both to said propelling member and to said casing, said valve member having an opened state allowing said fluidic communication between said propelling member and said casing; and
said propelling member comprises:
an expansion chamber configured to contain a gas, and a heating module configured to heat said expansion chamber such that said gas has a pressure value which is higher than a pressure value in said casing; or
a chamber configured to contain a liquid, and a heating module configured to heat said liquid for vaporising it and for obtaining a gas having a pressure value which is higher than a pressure value in said casing; or
a chamber configured to contain an explosive element, and an explosive primer configured to explode said explosive element such that said chamber has an internal pressure value which is higher than a pressure value in said casing.

9. A method for using a system according to claim 1, comprising the steps of:
selecting an optical article and loading said optical article into an internal space of a chamber of said system;
providing a coating device of said system, containing a determined volume of a predetermined coating composition in a casing of said coating device, and loading said coating device into the internal space of said chamber;
carrying out said coating treatment by activating a propelling member of said coating device and putting in fluidic communication said propelling member in an operative state with said casing; by virtue of which said determined volume of a predetermined coating composition is pressurized, vaporized and directed towards at least a face of said optical article;
unloading said optical article and said coating device from said chamber.

10. The method according to claim 9, wherein said step of providing said coating device comprises a step of selecting a coating device amongst a plurality of prepared coating devices or semi-prepared coating devices, according to parameters of said optical article to coat and in particular, according to a coating to apply and/or to a material comprised in an external surface of said optical article, and/or to a material comprised in a previously coated layer on said optical article.

11. The method according to claim 10, wherein said plurality of prepared coating devices or semi-prepared coating devices have distinct parameters, amongst a coating composition, and/or a volume of a coating composition contained in said casing, and/or said propelling member, and/or a pressurized parameter of said propelling member.

12. The method according to claim 10, wherein said step of providing said coating device further comprises, when the coating device selected is a semi-prepared coating device having a first module formed by a semi-prepared casing and/or a second module formed by a semi-prepared propelling member, a step of assembling said first module and said second module to form said coating device as a single cartridge unit.

13. A system for coating an optical article with a predetermined coating composition, comprising a chamber having an interior space configured to receive said optical article, a coating device configured to carry out a coating treatment of said predetermined coating composition for depositing it on said optical article in said chamber, by vaporizing said predetermined coating composition and by exposing at least a face of said optical article to the vaporized coating composition, and a control unit configured to control said coating device for coating said optical article by vaporizing said predetermined coating composition; said coating device being formed as a single cartridge unit, said coating device comprising a casing configured to contain said predetermined coating composition, a vaporizing conduit opening both into said casing and outside of said coating device, and a propelling member configured to pressurize said predetermined coating composition; said coating device being configured to put in fluidic communication said propelling member in an operative state with said casing in order to carry out said coating treatment; wherein:

said coating device further comprises a valve member which is interposed between and connected both to said propelling member and to said casing, said valve member having an opened state allowing said fluidic communication between said propelling member and said casing; and said propelling member comprises:
an expansion chamber configured to contain a gas, and a heating module configured to heat said expansion chamber such that said gas has a pressure value which is higher than a pressure value in said casing; or
a chamber configured to contain a liquid, and a heating module configured to heat said liquid for vaporising it and for obtaining a gas having a pressure value which is higher than a pressure value in said casing.

* * * * *